United States Patent
Yamagishi

(10) Patent No.: US 8,015,880 B2
(45) Date of Patent: Sep. 13, 2011

(54) PRESSURE SENSOR

(75) Inventor: Norio Yamagishi, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 359 days.

(21) Appl. No.: 12/445,610

(22) PCT Filed: Nov. 7, 2007

(86) PCT No.: PCT/JP2007/072054
§ 371 (c)(1),
(2), (4) Date: Apr. 15, 2009

(87) PCT Pub. No.: WO2008/062694
PCT Pub. Date: May 29, 2008

(65) Prior Publication Data
US 2010/0294022 A1    Nov. 25, 2010

(30) Foreign Application Priority Data
Nov. 20, 2006    (JP) ................................. 2006-312539

(51) Int. Cl.
*G01L 7/00* (2006.01)
*H01M 8/04* (2006.01)

(52) U.S. Cl. ............................. 73/706; 73/707; 429/423

(58) Field of Classification Search .................... None
See application file for complete search history.

(56) References Cited

U.S. PATENT DOCUMENTS

| | | | |
|---|---|---|---|
| 4,735,091 A | 4/1988 | Engeler et al. | |
| 2004/0072041 A1* | 4/2004 | Koschany | 429/23 |
| 2004/0106026 A1* | 6/2004 | Fujita et al. | 429/24 |
| 2008/0075992 A1* | 3/2008 | Fujita et al. | 429/24 |
| 2009/0325012 A1* | 12/2009 | Nor | 429/23 |
| 2010/0092821 A1* | 4/2010 | Takeshita | 429/25 |

FOREIGN PATENT DOCUMENTS

| | | |
|---|---|---|
| DE | 40 08 320 A1 | 9/1991 |
| DE | 103 61 867 A1 | 7/2005 |
| EP | 0 090 871 B1 | 1/1987 |
| JP | 44-009672 Y1 | 4/1969 |
| JP | 52-107787 A | 9/1977 |
| JP | 53-109483 U | 9/1978 |
| JP | 63-58731 U | 4/1988 |
| JP | 4-066305 B | 10/1992 |
| JP | 4-328437 A | 11/1992 |
| JP | 11-160182 A | 6/1999 |
| JP | 2005-164538 A | 6/2005 |
| JP | 2005-315602 A | 11/2005 |
| JP | 2006-162491 A | 6/2006 |

* cited by examiner

*Primary Examiner* — Andre Allen
(74) *Attorney, Agent, or Firm* — Kenyon & Kenyon LLP

(57) ABSTRACT

A pressure sensor is arranged on a supply/discharge pipe of a reactive gas to be supplied to or discharged from a fuel cell, and measures the pressure of the reactive gas in the pipe. The pressure sensor is provided with an engaging section which has a screw and engages with a pipe wall of the pipe; a pressure detecting section, which faces a reactive gas channel of the pipe and detects the pressure inside the pipe by displacement; a displacement sensor, which is arranged in the pressure detecting sensor and measures displacement of the pressure detecting section; and a buffer section, which connects the engaging section with the pressure detecting section by sandwiching a buffer layer which communicates with the reactive gas channel of the pipe, and eliminates abnormal displacement of the pressure detecting section by deforming to a stress generated by torque of the screw, at the time when the pressure sensor is engaged with the pipe.

6 Claims, 3 Drawing Sheets

PRESSURE SENSOR

This is a 371 national phase application of PCT/JP2007/072054 filed 7 Nov. 2007, claiming priority to Japanese Patent Application No. JP 2006-312539 filed 20 Nov. 2006, the contents of which are incorporated herein by reference.

FIELD OF THE INVENTION

The present invention relates to a pressure sensor, and more particularly, to a pressure sensor which is provided on a supply and discharge pipe of a reaction gas supplied to or discharged from a fuel cell and which measures a pressure of the reaction gas in the pipe.

BACKGROUND OF THE INVENTION

A fuel cell generates power by supplying a fuel gas to a fuel pole (anode electrode) and an oxidizing gas to an oxidation agent pole (cathode electrode), thereby allowing an electrochemical reaction between the fuel gas and the oxidizing gas. In a fuel cell, a fuel gas supply pipe for supplying the fuel gas to the body of the fuel cell, a fuel gas discharge pipe for discharging the fuel gas from the fuel cell body, an oxidizing gas supply pipe for supplying the oxidizing gas to the fuel cell body, and an oxidizing gas discharge pipe for discharging the oxidizing gas from the fuel cell body are provided. In this specification, these pipes are collectively referred to as a "supply and discharge pipe of reaction gas". A reaction gas flow path refers to a flow path in the reaction gas pipe through which the reaction gas is circulated.

In a fuel cell such as a solid polymer electrolyte fuel cell (PEFC), normally, an electrolytic membrane comprising a fluorine resin-based ion exchange membrane which is a proton-transmitting structure is sandwiched between an anode and a cathode each comprising a catalyst layer and a gas diffusion layer, to form an MEA (Membrane Electrode Assembly). A fuel gas such as, for example, hydrogen is supplied to the anode side of the MEA, and an oxidizing gas such as, for example, oxygen is supplied to the cathode side of the MEA so that a chemical reaction occurs at the catalyst layers. On the anode side, hydrogen is separated into a proton ($H^+$) and an electron ($e^-$), and the proton moves in the electrolytic membrane with the water molecule. The electron, meanwhile, moves to the cathode side through an external circuit. On the cathode side, the oxygen in the oxidizing agent and the proton and the electron moved from the anode side react, thereby generating water. Therefore, this moisture may flow into the reaction gas supply and discharge pipe.

For the reaction gas containing moisture flowing in the supply and discharge pipe, the temperature of the reaction gas is reduced when a filling pressure of the tank is lowered, according to the Boyle-Charles Law. In addition, when the fuel cell is placed in a low-temperature environment, a cold reaction gas flows. In such a situation, the moisture in the fluid may condensate on a pressure sensor portion or the like and the pressure sensor may be frozen. In particular, when the fuel cell system is stopped and a high-temperature reaction gas does not flow, the moisture may be frozen under the above-described environment.

In the react ion gas supply and discharge pipe, a pressure sensor for measuring the pressure of the reaction gas is provided, and the amount of generated power or the like of the fuel cell body is controlled by adjusting the pressure of the reaction gas. A pressure sensor of the related art comprises an engagement section which is threaded, which engages a pipe wall of a reaction gas pipe, and which is sealed by a seal member, a flange, a housing, a diaphragm which is a pressure-detecting section mounted on the housing, and a displacement sensor which is provided on the diaphragm. In the housing of the pressure sensor, a connecting chamber which is in communication with a reaction gas flow path is provided, and the connecting chamber faces a pressure-receiving surface of the diaphragm. The diaphragm opposes the connecting chamber, and detects the pressure of the reaction gas in the reaction gas pipe through deformation. The displacement sensor to which a terminal is connected measures the displacement of the diaphragm.

A pressure sensor of another example configuration of the related art comprises an engagement section which is threaded, which engages a pipe wall of a reaction gas pipe, and which is sealed by a seal member, a flange, a housing, a diaphragm which serves as a pressure-detecting section mounted on the housing, and a displacement sensor which is provided on the diaphragm. A pressure-receiving surface of the diaphragm faces a reaction gas flow path of the reaction gas pipe. The diaphragm directly detects the pressure of the reaction gas in the reaction gas flow path through deformation. The displacement sensor to which a terminal is connected measures the displacement of the diaphragm.

Meanwhile, JP 2006-162491 A discloses a pressure sensor in which a pressure-receiving surface on a side of a sensor element near the fluid to be measured is covered and sealed with a flexible structure, and an antifreeze agent is filled between the pressure-receiving surface of the sensor element and the flexible structure. JP 2005-164538 A discloses a pressure sensor in which a pressure sensor frost heater is mounted on a pressure sensor mounting boss and the moisture in the pressure sensor is defrosted.

SUMMARY OF INVENTION

In the pressure sensor of related art, because the connecting chamber is provided and the pressure-detecting section does not face the reaction gas flow path, when the moisture which is present on the pressure-receiving surface of the pressure-detecting section facing the side of the connecting chamber freezes, even if a reaction gas at a temperature exceeding 0° C. flows, the temperature in the connecting chamber is not increased, and, there is a problem in that a significant time period is required until the moisture is defrosted. Because of this, measurement by the pressure sensor is not assured until the moisture is defrosted and the pressure sensor is recovered.

In the pressure sensor of related art, the pressure sensor receives a tightening reaction force in a pipe direction by the torque of the screw when the engagement section and the pipe wall are tightened with a screw during the course of mounting the pressure sensor. The tightening reaction force is transmitted directly from the engagement section to the pressure-detecting section. Because of this stress, there is a problem in that an abnormal deformation occurs in the pressure-detecting section and the measurement precision is reduced.

An advantage of the present invention is provision of a pressure sensor in which such a problem is resolved, the surface water in the pressure-detecting section is quickly defrosted by the temperature of the reaction gas even when the surface water freezes, and the abnormal deformation of the pressure-detecting section due to tightening of the screw during mounting of the pressure sensor is prevented.

In order to achieve at least the above-described advantage, according to one aspect of the present invention, there is provided a pressure sensor which is provided at a supply and discharge pipe of a reaction gas which is supplied to or discharged from a fuel cell and which measures a pressure of the reaction gas in the pipe, the pressure sensor comprising an engagement section which is threaded and which engages a pipe wall of the pipe, a pressure-detecting section which faces a reaction gas flow path of the pipe and which detects a pressure in the pipe through displacement, a displacement sensor which is provided in the pressure-detecting section and which measures the displacement of the pressure-detecting section, and a buffer section which connects the engagement section and the pressure-detecting section with a buffer layer which is in communication with the reaction gas flow path of the pipe therebetween, and which absorbs an abnormal displacement occurring in the pressure-detecting section through deformation in response to a stress which occurs due to a torque of the screw when the pressure sensor is engaged to the pipe.

According to another aspect of the present invention, preferably, the buffer section has a structure which absorbs deformation occurring in a direction approximately perpendicular to an axial direction of the screw of the engagement section.

According to another aspect of the present invention, preferably, the pressure-detecting section is placed at an inner position in the pipe in relation to a seal member which seals the engagement section between the pipe and the pressure sensor.

According to another aspect of the present invention, preferably, the pressure-detecting section is placed with a pressure receiving-surface aligned with an inner wall surface of the pipe.

According to another aspect of the present invention, preferably, in the pressure sensor, the buffer section comprises a cylindrical internal buffer section which is connected at one end to the pressure-detecting section and which is approximately perpendicular to the reaction gas pipe, a cylindrical external buffer section which is connected at one end to the engagement section and which is approximately perpendicular to the reaction gas pipe, and an end bottom plate which is connected to the other ends of the internal buffer section and the external buffer section, and the buffer layer is defined by the internal buffer section, the external buffer section, and the end bottom plate.

According to another aspect of the present invention, preferably, in the pressure sensor, the internal buffer section and the external buffer section have circular cylindrical shapes, and the end bottom plate has an annular shape.

DETAILED DESCRIPTION

A preferred embodiment of the present invention will now be described in detail with reference to the drawings.

Figure 1:
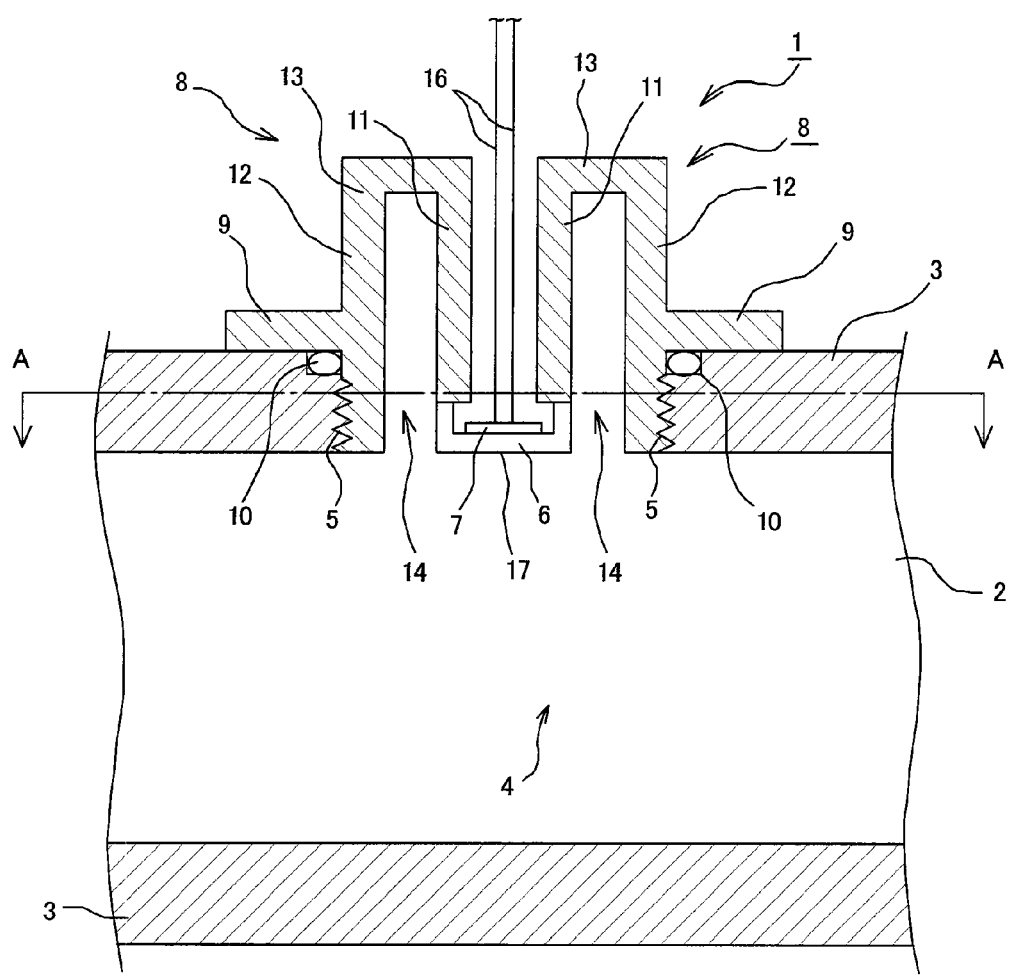
FIG. 1 is a cross sectional view schematically showing a structure of a preferred embodiment of a pressure sensor according to the present invention.

FIG. 1 shows a schematic structure of a preferred embodiment of a pressure sensor. A pressure sensor 1 comprises an engagement section 5, a diaphragm 6 which serves as a pressure-detecting section, a displacement sensor 7, and a buffer section 8.

The engagement section 5 is threaded and engages a screw section provided on a pipe wall 3 of a reaction gas pipe 2. With the engagement section 5, the screw is tightened and the pressure sensor 1 is fixed to the reaction gas pipe 2. In addition, a seal member 10 is provided on the engagement section 5 and seals the structure, so that the reaction gas or the like does not leak from the reaction gas pipe 2. Moreover, the pressure sensor 1 comprises a flange 9 at its outer periphery. With this flange 9, the tightening position of the engagement section 5 is determined. The flange 9 also presses the seal member 10 during tightening of the screw, so that the sealing tightness of the seal member 10 is secured.

The engagement section 5 of the pressure sensor 1 is screwed and pressed, during engagement with the pipe wall 3 of the reaction gas pipe 2, in a direction in which the pipe wall 3 is opened to the outside. That is, during the screwing, torque is generated and the torque causes a force to press into the direction of the pipe wall 3. With the pressing force, a tightening reaction force is generated in the engagement section 5 in a direction to close inward.

As shown in FIG. 1, the diaphragm 6 which serves as the pressure-detecting section has its pressure-receiving surface 17 placed facing the reaction gas flow path 4 of the reaction gas pipe 2. With this structure, even when the moisture present on the pressure-receiving surface 17 of the diaphragm 6 freezes, the moisture is quickly defrosted by flow of the reaction gas exceeding 0° C. The pressure-receiving surface 17 of the diaphragm 6 detects the pressure of the reaction gas in the reaction gas pipe 2 and is deformed. The deformation is measured by the displacement sensor 7 mounted on a side of the diaphragm 6 opposite the pressure-receiving surface 17, and a signal is output to the outside through a terminal 16.

The buffer section 8 connects the engagement section 5 and the diaphragm 6 with a buffer layer 14 which is in communication with the reaction gas flow path 4 of the gas pipe 2 therebetween. The buffer layer 14 refers to a part of the reaction gas flow path 4 which is projected from the reaction gas flow path 4 and which is widened in a bay shape. In other words, the engagement section 5 and the diaphragm 6 are not directly connected, but are connected via a detour with the buffer layer 14 in communication with the reaction gas flow path 4 of the gas pipe 2 therebetween. Because the engagement section 5 which engages the pipe wall 3 and the diaphragm 6 which faces the reaction gas flow path 4 of the gas pipe 2 are both positioned near the pipe wall 3 of the gas pipe 2, the engagement section 5 and the diaphragm 6 can be easily connected to each other. However, with the direct connection, due to the tightening of the screw, the torque of the screw causes a reaction force in the pipe direction, which is transmitted directly to the diaphragm 6. In order to avoid this, the engagement section 5 and the diaphragm 6 are connected via a detour with the buffer layer 14 therebetween.

In the present embodiment, the buffer section 8, which forms a frame, is provided as a structure for connecting the engagement section 5 and the diaphragm 6 via a detour. More specifically, the buffer section 8 comprises a cylindrical internal buffer section 11 which is connected at one end to the diaphragm 6 and which is approximately perpendicular to the reaction gas pipe 2, a cylindrical external buffer section 12 which is connected at one end to the engagement section 5 and which is approximately perpendicular to the reaction gas pipe 2, and an end bottom plate 13 which connects the other ends of the internal buffer section 11 and the external buffer section 12. The buffer layer 14 is defined by the internal buffer section 11, the external buffer section 12, and the end bottom plate 13. With this structure, the engagement section 5 and the diaphragm 6 are connected via a detour with the buffer layer 14 therebetween. In the present embodiment, the internal buffer section 11 and the external buffer section 12 have circular cylindrical shapes, and the end bottom plate 13 is a ring-shaped plate member. The internal buffer section 11, external buffer section 12, and end bottom plate 13 are integrally molded, or are joined by welding.

Figure 2:
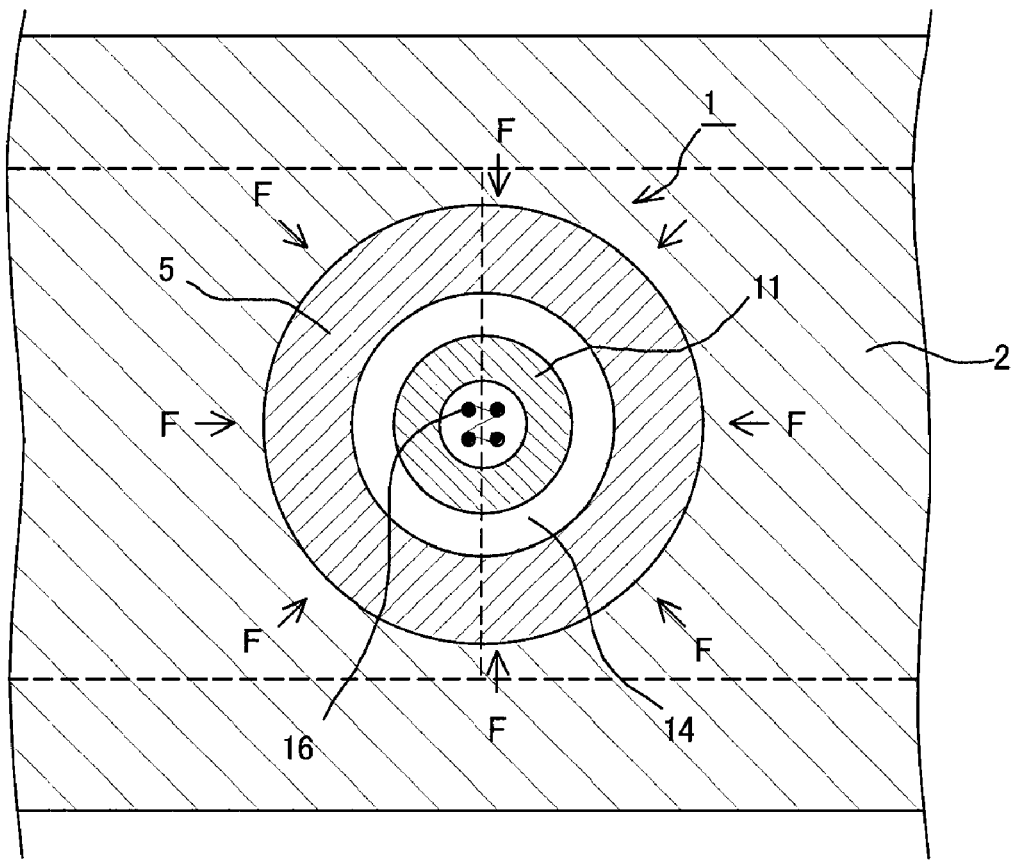
FIG. 2 is an explanation showing a function of a buffer layer during mounting of a pressure sensor.
Figure 3:
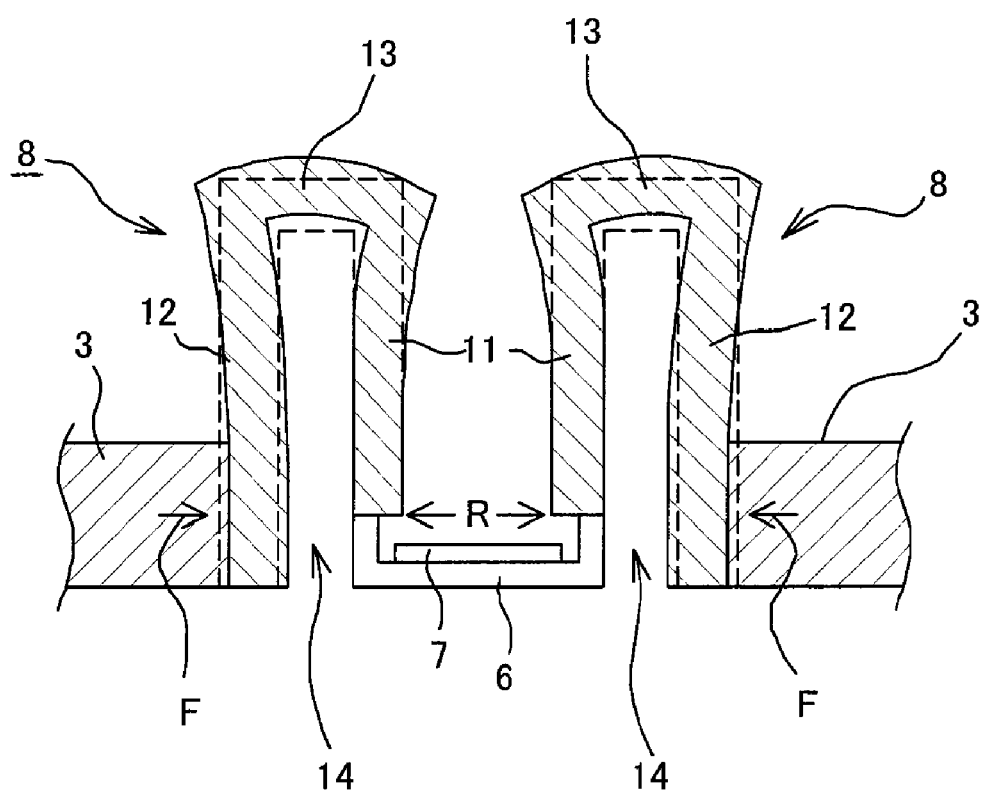
FIG. 3 is an explanation showing a bending deformation of a buffer section during mounting of a pressure sensor.

The buffer section 8 is bent and deformed as a frame when the pressure sensor 1 is engaged to the gas pipe 2, so as to absorb the tightening stress occurring in the diaphragm 6. This mechanism will now be described with reference to FIGS. 2 and 3. FIG. 2 is a cross sectional view along line A-A in FIG. 1, and shows a plane of the pressure sensor 1 as viewed from above. FIG. 3 is an explanatory diagram illustrating the bending deformation of the buffer section 8. The buffer section 8 shown in FIG. 3 with a dotted line indicates a shape before deformation, and the buffer section 8 shown with a solid line indicates a shape after deformation. As shown with an arrow in FIG. 2, a tightening stress (F) which compresses the pressure sensor 1 is generated in the engagement section 5 by tightening of the screw. The tightening stress (F) is a stress which is approximately equally distributed around the ring-shaped engagement section 5. Due to the tightening stress (F), the ring-shaped external buffer section 12 is compressively deformed toward the inside. Meanwhile, a component of the tightening stress (F) causes a bending moment on the buffer section 8 (external buffer section 12, end bottom plate 13, and internal buffer section 11) forming a part of the frame and is transmitted. However, the bending rigidity of the frame of the buffer section 8 is low as compared with the rigidity of the ring-shaped engagement section 5 against compression. Therefore, a large part of the tightening stress (F) occurring at the periphery of the ring-shaped engagement section 5 is distributed as a compression stress of the ring-shaped engagement section 5, and is not distributed as the stress which causes the bending moment of the buffer section 8 forming a part of the frame. With this structure, almost no reaction force (R) of the bending moment occurring at the diaphragm 6 shown in FIG. 3 is generated. In addition, the buffer section 8 which forms a part of the frame is bent and deformed as shown in FIG. 3 according to the compressive deformation of the engagement section 5. In other words, the buffer section 8 which forms a part of the frame having low rigidity prevents deformation of the diaphragm 6 with bending deformation, and the tightening stress is loaded on the ring-shaped engagement section 5 having high rigidity.

As described, in the pressure sensor 1 of the present invention, the buffer section 8 absorbs stress applied on the diaphragm 6 through deformation during engagement of the pressure sensor 1 to the gas pipe 2 at the engagement section 5. With this structure, reduction in the measurement precision due to deformation of the pressure-detecting section 6 can be prevented. In addition, the displacement sensor 7 is mounted at a tip of the internal buffer section 11 of the buffer section 8. With this structure, the diaphragm 6 can be placed facing the reaction gas flow path 4 of the reaction gas pipe 2, and abnormal deformation of the diaphragm 6 can be prevented.

In the present embodiment, the cross sectional shapes of the internal buffer section 11 and the external buffer section 12 of the pressure sensor 1 are circular cylinders, but may alternatively be, for example, closed polygonal cylinders. Similarly, although the end bottom plate 13 is described as a ring-shaped plate member, the end bottom plate 13 may alternatively be a ring-shaped polygon plate member.

INDUSTRIAL APPLICABILITY

As described, the pressure sensor of the present invention is useful as a pressure sensor provided on a supply and discharge pipe of a reaction gas which is supplied to or discharged from a fuel cell and which measures a pressure of the reaction gas in the pipe.

The invention claimed is:

1. A pressure sensor which is provided at a supply and discharge pipe of a reaction gas which is supplied to or discharged from a fuel cell and which measures a pressure of the reaction gas in the pipe, the pressure sensor comprising:
    an engagement section which is threaded and which engages a pipe wall of the pipe;
    a pressure-detecting section which faces a reaction gas flow path of the pipe and which detects a pressure in the pipe through displacement;
    a displacement sensor which is provided in the pressure-detecting section and which measures the displacement of the pressure-detecting section; and
    a buffer section which connects the engagement section and the pressure-detecting section with a buffer layer which is in communication with the reaction gas flow path of the pipe therebetween, and which absorbs an abnormal displacement occurring in the pressure-detecting section through deformation in response to a stress which is applied due to a torque of the screw when the pressure sensor is engaged to the pipe.

2. The pressure sensor according to claim 1, wherein the buffer section has a structure which absorbs deformation occurring in a direction approximately perpendicular to an axial direction of the screw of the engagement section.

3. The pressure sensor according to claim 1, wherein the pressure-detecting section is placed at an inner position in the pipe in relation to a seal member which seals the engagement section between the pipe and the pressure sensor.

4. The pressure sensor according to claim 1, wherein the pressure-detecting section is placed with a pressure receiving-surface aligned with an inner wall surface of the pipe.

5. The pressure sensor according to claim 1, wherein the buffer section comprises a cylindrical internal buffer section which is connected at one end to the pressure-detecting section and which is approximately perpendicular to the reaction gas pipe, a cylindrical external buffer section which is connected at one end to the engagement section and which is approximately perpendicular to the reaction gas pipe, and an end bottom plate which is connected to the other ends of the internal buffer section and the external buffer section, and
    the buffer layer is defined by the internal buffer section, the external buffer section, and the end bottom plate.

6. The pressure sensor according to claim 5, wherein the internal buffer section and the external buffer section have circular cylindrical shapes, and
    the end bottom plate has an annular shape.

* * * * *